(12) United States Patent
Yamanaka et al.

(10) Patent No.: US 7,637,532 B2
(45) Date of Patent: Dec. 29, 2009

(54) OCCUPANT DETECTION SYSTEM

(75) Inventors: Shoichi Yamanaka, Anjo (JP); Hiroyuki Ito, Chita (JP); Tsutomu Kamizono, Nagoya (JP)

(73) Assignee: Denso Corporation, Kariya (JP)

( * ) Notice: Subject to any disclaimer, the term of this patent is extended or adjusted under 35 U.S.C. 154(b) by 218 days.

(21) Appl. No.: 11/899,355

(22) Filed: Sep. 4, 2007

(65) Prior Publication Data
US 2008/0054609 A1 Mar. 6, 2008

(30) Foreign Application Priority Data
Sep. 5, 2006 (JP) .............................. 2006-240449

(51) Int. Cl.
*B60R 21/16* (2006.01)
(52) U.S. Cl. ....................... 280/735; 180/273; 340/666; 340/667
(58) Field of Classification Search ................. 180/273, 180/274; 280/735; 340/666, 667
See application file for complete search history.

(56) References Cited

U.S. PATENT DOCUMENTS

| | | | | |
|---|---|---|---|---|
| 5,618,056 | A * | 4/1997 | Schoos et al. ................ | 280/735 |
| 6,348,862 | B1 * | 2/2002 | McDonnell et al. ......... | 340/562 |
| 6,392,542 | B1 * | 5/2002 | Stanley ........................ | 340/561 |
| 6,490,936 | B1 * | 12/2002 | Fortune et al. .......... | 73/862.581 |
| 6,554,318 | B2 * | 4/2003 | Kohut et al. ............. | 280/801.1 |
| 6,563,231 | B1 * | 5/2003 | Stanley et al. ............... | 307/10.1 |
| 6,729,194 | B2 * | 5/2004 | Kaijala et al. ............. | 73/862.69 |
| 7,436,315 | B2 * | 10/2008 | Kamizono et al. .......... | 340/667 |
| 7,469,594 | B2 * | 12/2008 | Jitsui et al. ..................... | 73/779 |
| 7,497,465 | B2 * | 3/2009 | Wato et al. .................. | 280/735 |
| 7,575,085 | B2 * | 8/2009 | Kamizono et al. .......... | 180/273 |
| 2001/0045733 | A1 * | 11/2001 | Stanley et al. ............... | 280/735 |
| 2005/0275202 | A1 | 12/2005 | Wato et al. | |

FOREIGN PATENT DOCUMENTS

| | | |
|---|---|---|
| JP | 2001-056259 | 2/2001 |
| JP | 2002-022575 | 1/2002 |
| JP | 2006-201129 | 8/2006 |

* cited by examiner

*Primary Examiner*—Toan C To
(74) *Attorney, Agent, or Firm*—Harness, Dickey & Pierce, PLC

(57) ABSTRACT

The present invention facilitates the construction of a waterproof sensor assembly having, for example, a sensor main body arranged in a vehicle seat, a sensor terminal, a sensor terminal protection portion, a first packing having a hollow ring shape, a second packing having a hollow ring shape, a connector casing having a hollow ring shaped opening, and a connector cover for covering the opening connector casing opening. The sensor terminal protection portion has a hollow ring shape and is integrated with a periphery of the sensor main body. The sensor terminal is integrated with the sensor terminal protection portion such that the sensor terminal protrudes from an inner periphery of the sensor terminal protection portion toward an inside of the sensor terminal protection portion. The arrangement of the first and second packing and the connector case and cover provide a high performance waterproof sealing of the sensor and parts thereof.

11 Claims, 4 Drawing Sheets

OCCUPANT DETECTION SYSTEM

CROSS-REFERENCE TO RELATED APPLICATIONS

The present invention is related to and claims priority from Japanese Patent Application No. 2006-240449 filed on Sep. 5, 2006 the contents of which are incorporated herein by reference.

BACKGROUND OF THE INVENTION

1. Field of the Invention

The present invention relates to a structure of a terminal of an occupant detection sensor mounted on a vehicle seat and to a structure of a connector containing the terminal.

2. Description of the Background Art

An occupant detection system includes, for example, a capacity type sensor, a connector, and an occupant detection ECU (electronic control unit). The capacity type sensor outputs turbulence of a weak electric field generated at an electrode as a current or a voltage as described, for example, in Unexamined Japanese Application Publication No. 2006-27591 A. The occupant detection ECU determines, based on the current or the voltage output from the capacity type sensor, whether or not an occupant sits on a vehicle seat.

A connector is provided at an end of the capacity type sensor. The connector internally makes electric connection between the capacity type sensor and the occupant detection ECU. The capacity type sensor is mainly mounted inside the vehicle seat. The connector at the end of the capacity type sensor is also disposed inside or near the seat. Therefore, the connector needs to be waterproof against intrusions from liquids such as spilled juice, normal saline, rain, seat cleaning liquids and the like, so as to protect the connector inside against water or liquid exposure. FIGS. 8A and 8B show the structure of a conventional connector. FIG. 8A is a plan view of the connector with a cover 104 removed. FIG. 8B is a front view thereof with the cover 104 in FIG. 8A mounted.

The conventional connector includes a case 103 having a circular opening 103a and the cover 104 to cover the opening 103a. The opening 103a is recessed at the center of a top surface of the case 103. The opening 103a contains a terminal, hereafter referred to as an ECU terminal, electrically connecting to an occupant detection ECU (not shown). A circular first packing 105 is attached to an end face of the opening 103a. A corresponding circular second packing 106 is also attached to the cover 104.

An end 122 of the capacity type sensor, hereafter referred to as a sensor end, is disposed so as to be sandwiched between the first packing 105 and the second packing 106. A terminal 123 is formed at the sensor end 122 and contacts with an ECU terminal (not shown) in the case 103.

Conventionally, a width of the sensor end 122 in a horizontal direction of FIG. 8B is smaller than widths of the first packing 105 and the second packing 106 at their outside ends in the horizontal direction of FIG. 8B so that the connector can contain the sensor end 122.

According to the conventional structure, however, a thickness of the sensor end 122 in a vertical direction of FIG. 8B causes gaps A near both sides of the sensor end 122 left and right in FIG. 8B, such as at positions surrounded by the sensor end 122, the first packing 105, and the second packing 106. The gap A passes through the outside and the inside of the connector along the sensor end 122 and thus inhibits the waterproof integrity or waterproof performance of the connector. As will be widely appreciated, water exposure may short-circuit a terminal in the connector.

One solution to the above described problem includes a scenario where the first packing 105 and the second packing 106 can be made of a highly flexible material such as silicone gel. The silicone gel can transform so as to enter and fill the gap A. Since the silicone gel is expensive, however, production costs increase.

SUMMARY OF THE INVENTION

The present invention has been made in consideration of the foregoing. It is therefore an object of the present invention to provide an occupant detection system capable of improving a connector's waterproof performance without using an expensive material.

An occupant detection system according to the invention includes an occupant detection sensor, a connector case, and a connector cover. The occupant detection sensor includes: a sensor body arranged in at least one of a seating surface section and a backrest section of a vehicle seat; a framework sensor terminal protection section integrated with a sensor body end; and a sensor terminal section integrated with the sensor terminal protection section so as to protrude from an inside periphery to an inside of the same. The connector case has a framework opening. The connector cover covers the connector case opening and totally sandwiches the sensor terminal protection section between itself and an end face of the connector case opening.

The term "framework" as used in connection with the present invention can signify a hollow shape formed around or encircling a center. Some examples include a hollow circle, a hollow oval, a hollow triangle, and a hollow rectangle or polygon; however other shapes not specifically mentioned are possible. For example, the hollow rectangle signifies a rectangular frame. The sensor body, the sensor terminal protection section, and the sensor terminal section are formed integrally. The invention includes equivalents integrally formed from the same film.

A construction of the invention will be described below. According to the invention, the connector case and the connector cover totally sandwich the framework sensor terminal protection section formed integrally with an end of the occupant detection sensor. Nothing may exist between the sensor terminal protection section and the connector case and between the same and the connector cover. That is, the sensor terminal protection section may directly contact with the connector case and the connector cover.

In the present example, the sensor terminal protection section and the connector case are formed so that one end face of the sensor terminal protection section along a framework axis direction and a connector case opening's end face, hereafter referred to as an opening end face, make at least a line contact over all peripheries. Making at least a line contact signifies not only a line contact between the one end face and the opening end face over all peripheries but also a total or partial contact over all peripheries.

Further, the sensor terminal protection section and the connector case are formed so that the other end face of the sensor terminal protection section along the framework axis direction and a connector cover's face, hereafter referred to as a closing surface, closing the connector case's opening end face make at least a line contact over all peripheries on the other end face.

The sensor terminal protection section is formed so that its outside periphery is larger than an inside periphery of the connector case's opening end face and it's inside periphery is smaller than an outside periphery of the same. An outside periphery of the connector cover's closing surface is larger than at least an inside periphery of the sensor terminal protection section. The connector case and the sensor terminal protection section are arranged so that an opening axis for the connector case's opening end face is parallel to a framework axis of the sensor terminal protection section and the connector case's opening end face and one end face of the sensor terminal protection section in the framework axis make at least a line contact with each other over all peripheries. The connector cover is arranged so that its closing surface and the other end face of the sensor terminal protection section in the framework axis make at least a line contact with each other over all peripheries.

The connector case and the connector cover are arranged so as to sandwich and press the sensor terminal protection section in directions opposite to each other. In the present example, the connector case is pressed against the connector cover along the framework axis direction of the sensor terminal protection section. The connector cover is pressed against the connector case along the same direction. Therefore, no gaps exist among the connector case, the sensor terminal protection section, and the connector cover. Conventionally, a sensor thickness causes such a gap passing through the outside and the inside of the connector as described hereinabove. The invention improves waterproof performance such as a capability of preventing the connector inside from being exposed to water. The invention further prevents the sensor terminal section and the ECU terminal from increasing a stray capacitance, and prevents anomalies such as short-circuiting and contact failure from occurring.

While, as mentioned above, the sensor terminal protection section, the connector case, and the connector cover directly contact with each other, the invention is not limited only to such embodiments. A packing may be provided between the sensor terminal protection section and the connector case, and between the same and the connector cover.

The invention uses first and second framework packings. The first packing is pressed between the connector case's opening end face and one end face of the sensor terminal protection section in the framework axis direction. The second packing is pressed between the connector cover and the other end face of the sensor terminal protection section in the framework axis direction. Both packings are shaped into frameworks. The packing is made of a material softer than the connector case and the connector cover. An inexpensive material may be used such as resin or rubber.

The first packing is arranged so as to contact with the connector case's opening end face over all peripheries. The second packing is arranged so as to contact with the connector cover's closing surface over all peripheries. The first packing is formed so as to make at least a line contact with one end face of the sensor terminal protection section over all peripheries in the framework axis direction. The second packing is formed so as to make at least a line contact with the other end face of the sensor terminal protection section over all peripheries in the framework axis direction.

The first packing is arranged between the connector case and the sensor terminal protection section. The second packing is arranged between the connector cover and the sensor terminal protection section. That is, both packings sandwich the sensor terminal protection section.

The first packing is pressed from the connector case's opening end face to one end face of the sensor terminal protection section in the framework axis direction. The second packing is pressed from the connector cover to the other end face of the sensor terminal protection section in the framework axis direction. Both packings are pressed to sandwich the sensor terminal protection section. The packings are provided among the sensor terminal protection section, the connector case, and the connector cover in a compressed manner, further improving adhesiveness of the sensor terminal protection section on both end faces in the framework axis direction. The invention further improves the waterproof effect and the effect of protecting the sensor terminal section and the occupant detection ECU terminal against failures.

In the occupant detection system according to the invention, the sensor terminal protection section is preferably formed so as to maintain a uniform distance between both end faces in the framework axis. That is, the sensor terminal protection section is preferably designed and manufactured so as to maintain a uniform distance between the face in contact with the connector case and the face in contact with the connector cover or between the face in contact with the first packing and the face in contact with the second packing. The uniform distance includes distance variations due to a manufacturing error.

When the sensor terminal protection section directly contacts with the connector case and the connector cover, shapes of the connector case's opening end face and the connector cover's closing surface are uniquely determined corresponding to the end faces of the sensor terminal protection section in the framework axis direction. When a uniform distance is ensured between both end faces of the sensor terminal protection section in the framework axis direction, the connector case's opening end face and the connector cover's closing surface can be shaped identically. The connector case and the connector cover can be formed easily. The sensor terminal protection section can be easily formed from a film that has a predetermined uniform distance between both end faces.

When the sensor terminal protection section directly contacts with the first and second packings, shapes of one end face of the first packing and one end face of the second packing are uniquely determined corresponding to the end faces of the sensor terminal protection section in the framework axis. When a uniform distance is ensured between both end faces of the sensor terminal protection section in the framework axis direction, one end face of the first packing and one end face of the second packing can be shaped identically. The first and second packings can be formed easily.

It is preferable to form both end faces of the sensor terminal protection section such that they are flat in the framework axis direction. When the sensor terminal protection section directly contacts with the connector case and the connector cover, the connector case's opening end face and the connector cover's closing surface, which make contact with both end faces of the sensor terminal protection section when formed flat, can also be flat. As a result, the connector case and the connector cover can be formed more easily. When the sensor terminal protection section directly contacts with the first and second packings, the surfaces of the first and second packings contacting with both end faces of the sensor terminal protection section can also be flat. As a result, the first and second packings can be formed more easily.

When both of the end faces of the sensor terminal protection section in the framework axis direction are flat, the sensor terminal protection section can be made of a flat film, making the manufacture thereof relatively easy. One end face of the sensor terminal protection section in the framework axis direction contacts flush with the connector case's opening end face. The other end face of the sensor terminal protection section in the framework axis direction contacts flush with the corresponding connector cover's face. One end face of the sensor terminal protection section in the framework axis direction contacts flush with one end face of the first packing. The other end face of the sensor terminal protection section in the framework axis direction contacts flush with one end face of the second packing further improving adhesiveness between contacting surfaces and the waterproof effect.

A capacity type sensor is used as a sensor body of the occupant detection sensor according to the invention, for example. Some capacity type sensors use a circuit and an electrode including a multi-layer film aggregate and a conductor sandwiched between the layers.

When using the sensor body having the above described construction, the sensor terminal protection section and the sensor body as a capacity type sensor are preferably structured the same. The sensor terminal protection section preferably includes a film aggregate of layers each constituting a framework and a circuit electrode made of a conductor sandwiched between the layers.

The sensor terminal protection section can be formed simultaneously with the capacity type sensor as part thereof. Using the same structure as the capacity type sensor, the sensor terminal protection section can be easily formed and can be more easily integrated with the capacity type sensor.

When each layer of the film aggregate for the sensor terminal protection section is formed to be a framework, the sensor terminal protection section can be formed so as to cause no gap between the films. It is possible therefore to prevent water or the like from entering the connector inside from between the films.

When each layer of the film aggregate forms a framework, both ends of layered films make at least a line contact with the connector case, the connector cover, the first packing, or the second packing over all peripheries. Gaps can be prevented between both ends of the layered films and the connector case, the connector cover, and the like. It is possible to prevent water or the like from entering from between both ends of the layered films and the connector case, the connector cover, and the like.

Without using an expensive material, the occupant detection system according to the invention can improve the waterproof performance for the connector having the connector case and the connector cover. The system can prevent the sensor terminal and the ECU terminal from increasing a stray capacitance due to water exposure and anomalies such as short-circuiting and a contact failure from occurring.

DETAILED DESCRIPTION OF THE PREFERRED EMBODIMENTS

First Embodiment

Figure 1:
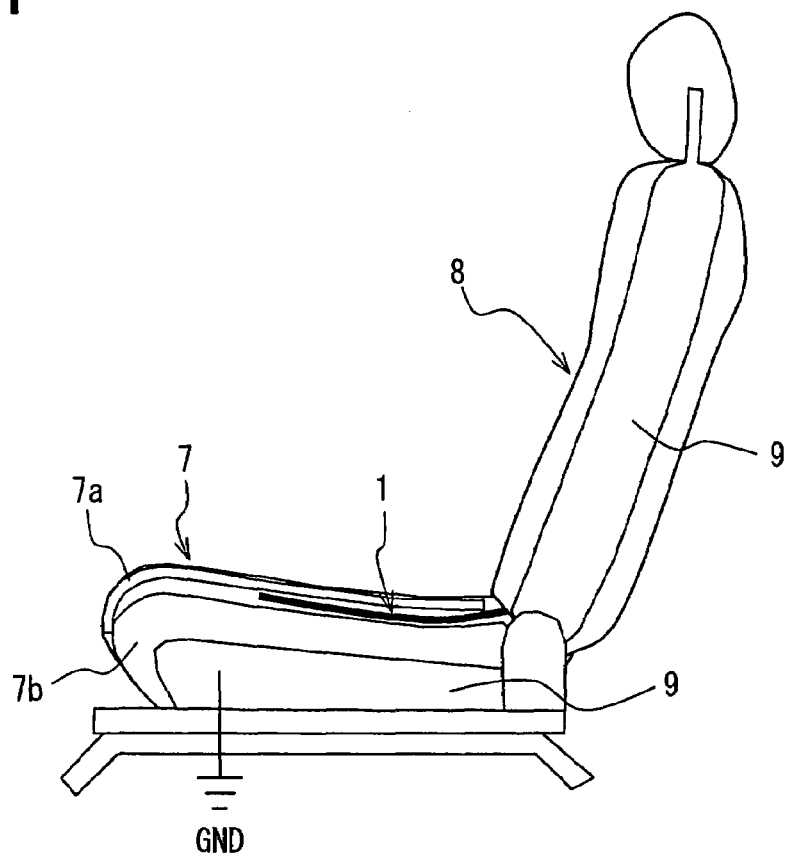
FIG. 1 is a diagram showing an occupant detection system provided for a vehicle seat.
Figure 2:
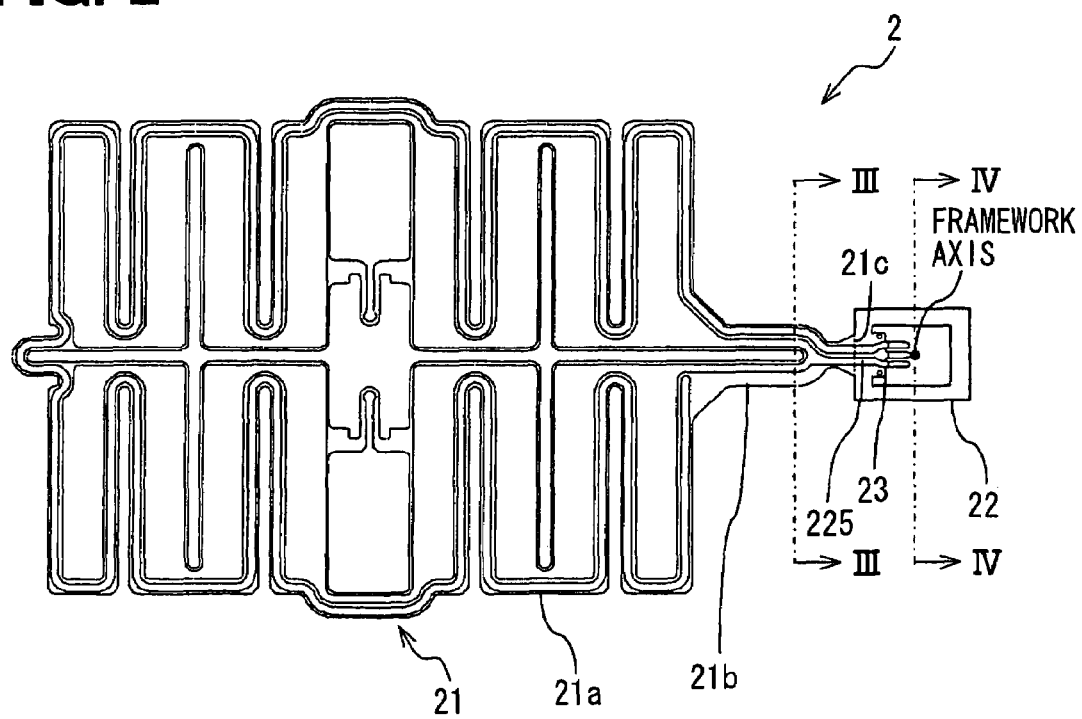
FIG. 2 is a diagram showing a plan view of an occupant detection sensor according to a first embodiment.

Embodiments of the occupant detection sensor according to the present invention will be described with reference to the accompanying drawings. FIG. 1 shows an occupant detection system 1 provided for a vehicle seat. FIG. 2 is a plan view of an occupant detection sensor 2.

The vehicle seat will be described with reference to FIG. 1. The vehicle seat includes a seating surface section 7, a backrest section 8, and a seat frame 9. The seating surface section 7 forms a major part of the seat where an occupant sits. The seating surface section 7 includes a seating surface skin 7a and a seat cushion 7b. The seating surface skin 7a forms a top surface of the seating surface section 7. The seat cushion 7b is placed under the seating surface skin 7a. Similarly to the seating surface section 7, the backrest 8 includes a backside skin (not shown) and a rear cushion (not shown). The seat frame 9 is made of metal, electrically connects with a vehicle ground (GND), and forms a seat framework. A sensor body 21, to be described in greater detail hereinafter, is included in the occupant detection system 1 according to the first embodiment and is placed between the seating surface skin 7a and the seat cushion 7b of the seating surface section 7.

The occupant detection system 1 includes an occupant detection sensor 2 for detecting an occupant who is to be seated on the vehicle seat. For example, the occupant detection sensor 2 detects whether an occupant is seated or the seat is vacant. Further, the occupant detection sensor 2 determines types of occupants such as adult, child, and child seat. The first embodiment uses a capacity type sensor for the occupant detection sensor 2. The capacity type sensor outputs turbulence of a feeble electric field generated at an electrode as a current or a voltage.

Detection information about an occupant is generated by the occupant detection sensor 2 and can be used to determine actions such as whether or not to turn on an alarm lamp for a seat belt warning system. For example, the alarm lamp lights when the sensor detects that an occupant sits on the seat and does not fasten the seat belt.

Detection of an occupant by the occupant detection sensor 2 is also used to determine whether or not to activate a passive safety device such as an air bag. For example, the passive safety device is activated when a vehicle collides with an object and it is determined that an adult sits on the seat. When it is determined that a child sits on the seat or the seat is vacant, however, the passive safety device is not activated even though the vehicle collides with an object.

The occupant detection system 1 will be described in more detail. The occupant detection system 1 includes the occupant detection sensor 2, a connector case 3, and a connector cover 4.

The occupant detection sensor 2 is formed on a flexible printed circuit (FPC) provided with electrodes and circuits using, for example, a plastic resin film such as a polyethylene terephthalate (PET), polyethylene naphthalate (PEN) or the like, film as a base. A cross sectional structure of the occupant detection sensor 2 will be described later. The occupant detection sensor 2 includes a sensor body 21, a sensor terminal protection section 22, and a sensor terminal section 23. These are integrated with each other according to the first embodiment.

The sensor body 21 is provided inside the seat's seating surface section 7. More specifically, the sensor body 21 is placed between the seating surface skin 7a and the seat cushion 7b. As shown in FIG. 2, the sensor body 21 includes a sensor electrode section 21a and a conductive section 21b. The sensor electrode section 21a is approximately centered at the seating surface section 7. The conductive section 21b is formed so as to extend from part of the sensor electrode section 21a toward the right end of FIG. 2. A width or thickness of the conductive section 21b in a vertical direction of FIG. 2 is smaller than that of the sensor electrode section 21a in the vertical direction thereof. The conductive section 21b is provided with a lead-out end 21c at an end opposite the sensor electrode section 21a.

The sensor electrode section 21a uses the seat frame as an opposite electrode and generates an electric field between itself and the seat frame 9. When the seat is vacant, a relative permittivity between both electrodes is equivalent to that of air. When an occupant sits on the seat, a relative permittivity is equivalent to that of a human body because it intervenes between both electrodes. A capacity between both electrodes varies with whether the seat is vacant or is occupied by an occupant. A detected current varies accordingly.

The conductive section 21b transmits the current change in the sensor electrode section 21a to the lead-out end 21c. The sensor body 21 detects a change in the capacity between the sensor electrode section 21a and the seat frame 9 as an opposite electrode in terms of a current change as described, for example, in Unexamined Japanese Application Publication No. 2006-27591 A.

Figure 3:
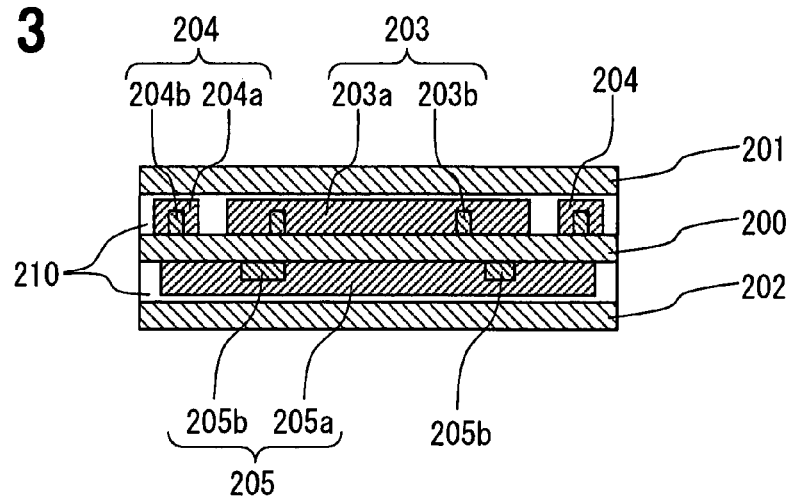
FIG. 3 is a diagram showing a cross sectional view along the line III-III of FIG. 2 rotated 90 degrees counterclockwise.

A cross sectional structure of the sensor body 21 will be described with reference to FIG. 3. FIG. 3 is a cross sectional view along the line III-III of FIG. 2 rotated 90 degrees counterclockwise. A nearer side in FIG. 2 is equivalent to the top in FIG. 3. Widths of the films 200, 201, and 202 and those of the electrodes 203, 204, and 205 are exaggerated in the vertical direction for convenience of explanation.

As shown in FIG. 3, the sensor body 21 uses a multi-layer film including a base film 200, an upper film 201, and a lower film 202. The sensor body 21 also includes a first electrode 203, a second electrode 204, and a third electrode 205 as conductors. As shown in FIG. 3, the multi-layer film contains a layer of the upper film 201, the base film 200, and the lower film 202 in order from the top to the bottom in the drawing. The films are bonded to each other with an adhesive 210.

The first electrode 203 is sandwiched between the upper film 201 and the base film 200. The first electrode 203 is arranged approximately at the center of the base film 200. The first electrode 203 contains a carbon electrode portion 203a and a silver electrode portion 203b. The carbon electrode portion 203a is rectangular. The silver electrode portion 203b forms a rectangular frame. The silver electrode portion 203b is positioned slightly inside an outside periphery of the carbon electrode portion 203a.

Similarly to the first electrode 203, the second electrode 204 is sandwiched between the upper film 201 and the base film 200. The second electrode 204 is arranged outside the first electrode 203 such as to the left and the right sides thereof as shown in FIG. 3. The second electrode 204 contains a carbon electrode portion 204a and a silver electrode portion 204b. The carbon electrode portion 204a and the silver electrode portion 204b of the second electrode 204 are constructed almost similarly to the carbon electrode portion 203a and the silver electrode portion 203b of the first electrode 203.

The third electrode 205 is sandwiched between the base film 200 and the lower film 202. The third electrode 205 contains a carbon electrode portion 205a and a silver electrode portion 205b. The carbon electrode portion 205a and the silver electrode portion 205b of the third electrode 205 are constructed almost similarly to the carbon electrode portion 203a and the silver electrode portion 203b of the first electrode 203.

Functions of the electrodes 203 through 205 will be described concisely. The first electrode 203 and the second electrode 204 generate an electric field opposite to the seat frame 9 via the seating surface skin 7a of the seat to detect whether or not an occupant is seated. The second electrode 204 also detects whether or not the seat is exposed to water. When no occupant is seated, the third electrode 205 generates an electric field opposite to the seat frame 9 via the seat cushion 7b of the seat. The third electrode 205 more accurately detects whether or not an occupant is seated.

Figure 4:
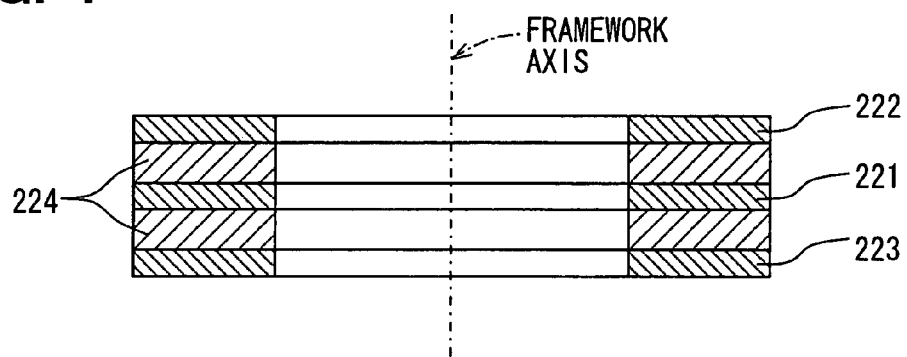
FIG. 4 is a diagram showing a cross sectional view along the line IV-IV of FIG. 2 rotated 90 degrees counterclockwise.

The sensor terminal protection section 22 will be described with reference to FIGS. 2 and 4. FIG. 4 is a cross sectional view along the line IV-IV of FIG. 2 rotated 90 degrees counterclockwise. A nearer side in FIG. 2 is equivalent to the top in FIG. 4.

As a whole, the sensor terminal protection section 22 resembles a rectangle hollowed around the center as shown in FIG. 2. The sensor terminal protection section 22 is a hollow rectangle, a rectangular frame, a "framework" as recited, for example, in claim 1, or the like and is formed flat. The sensor terminal protection section 22 is further integrated with the end of the sensor body 21, that is, the lead-out end 21c of the conductive section 21b.

Similarly to the sensor body 21, the sensor terminal protection section 22 uses a multi-layer film such as a "film aggregate" as recited, for example, in claim 4, including a base film 221, an upper film 222, and a lower film 223 as shown in FIG. 4. The base film 221 of the sensor terminal protection section 22 is integrated with the base film 200 of the sensor body 21. The upper film 222 of the sensor terminal protection section 22 is integrated with the upper film 201 of the sensor body 21. The lower film 223 of the sensor terminal protection section 22 is integrated with the lower film 203 of the sensor body 21.

The films 221 through 223 form layers of hollow rectangles of the same size. As shown in FIG. 4, the films 221 through 223 of the sensor terminal protection section 22 are layered so that one framework axis, an axis passing through the center of the framework shown and labeled in FIG. 2 and shown as a dotted line and labeled in FIG. 4, coincides with the others. The films are bonded to each other with an adhesive 224. The sensor terminal protection section 22 is formed so as to equalize a distance between both end faces, such as between the top and bottom end faces shown in FIG. 4, and flatten both end faces in the framework axis direction.

The sensor terminal protection section 22 includes a conductor 225 so as to be sandwiched between the films 221 through 223 on the left side of the hollow rectangle in FIG. 2. The conductor 225 is formed so as to extend from the outside periphery to the inside periphery on the left side of the hollow rectangle in FIG. 2. The conductor 225 is provided as a circuit electrode structured similarly to the first electrode 203, the second electrode 204, and the third electrode 205 of the sensor body 21 as shown in FIG. 3. The outside periphery of the conductor 225 is electrically connected to the electrodes 203, 204, and 205 for the lead-out end 21c of the conductive section 21b of the sensor body 21. The inside periphery of the conductor 225 is electrically connected to the sensor terminal section 23 to be described. That is, the sensor terminal protection section 22 has no conductors on the top, bottom, and right sides of the hollow rectangle in FIG. 2.

The sensor terminal section 23 is integrally formed so as to protrude from the inside periphery of the sensor terminal protection section 22 on the left side in FIG. 2 to the inside periphery of the sensor terminal protection section 22 as the hollow rectangle, such as toward the center of the hollow rectangle. That is, the sensor terminal section 23 is integrated with layers of the films 221 through 223 and the circuit electrode or conductor 225 extending from the lead-out end 21c for the sensor body 21 to the inside periphery of the sensor terminal protection section 22.

The sensor terminal section 23 is electrically connected to the conductor 225 of the sensor terminal protection section 22. The sensor terminal section 23 is tipped with a terminal electrode 23a having each conductor exposed. The terminal electrode 23a contacts with an ECU terminal (not shown) in a connector case 3, to be described in greater detail hereinafter, and transmits a signal from the sensor body 21 to the ECU terminal.

Figure 5A:
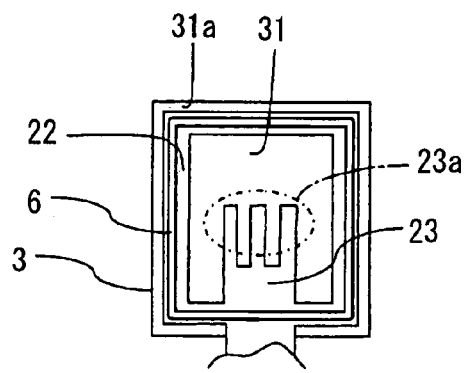
FIG. 5A is a diagram showing a plan view of a connector according to the first embodiment with a connector cover removed.
Figure 5B:
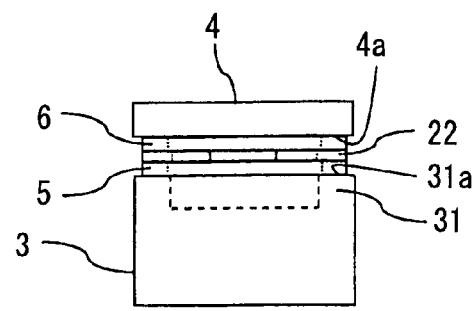
FIG. 5B is a diagram showing a front view of the connector in FIG. 5A with the connector cover mounted.

Referring now to FIG. 5, the following describes the occupant detection sensor 2 and a connector. The connector electrically connects the occupant detection sensor 2 with an occupant detection ECU (not shown) that uses a signal from the occupant detection sensor 2 as information for determining the presence or absence of an occupant. FIG. 5 shows a connector structure. FIG. 5A is a plan view of the connector with the connector cover 4 removed. FIG. 5B is a front view of the connector in FIG. 5A with the connector cover mounted. The connector uses the connector case 3 and the connector cover 4 made of resin, and a first packing 5 and a second packing 6 made of resin or rubber.

The connector case 3 is a rectangular parallelepiped and is recessed at the center of a top surface in FIG. 5B. The other part of the connector case 3 except the recessed bottom forms a framework. That is, the connector case 3 includes an opening 31 like a framework. The opening 31 has an opening end face 31a that is a flat, hollow rectangle. The opening end face 31a of the connector case 3 is formed almost equally to an end face, hereafter referred to as a framework end face, of the sensor terminal protection section 22 in the framework axis direction.

More specifically, a distance between opposite outside peripheries of the opening end face 31a of the connector case 3 is slightly larger than a distance between opposite outside peripheries of the framework end face of the sensor terminal protection section 22. A distance between opposite inside peripheries of the opening end face 31a of the connector case 3 is slightly larger than a distance between opposite inside peripheries of the framework end face of the sensor terminal protection section 22. The distance between opposite outside peripheries of the framework end face of the sensor terminal protection section 22 is smaller than the distance between opposite outside peripheries of the opening end face 31a of the connector case 3 and is larger than the distance between opposite inside peripheries thereof.

A terminal, which hereafter can be referred to as an ECU terminal, is electrically connected to the occupant detection ECU (not shown) and is provided inside the opening 31 of the connector case 3. Though not shown, part of the ECU terminal is embedded in the bottom of the opening 31 of the connector case 3 and is fixed. Inside the connector case 3, a space different from the opening 31 is formed below the bottom of the opening 31, such as toward the bottom in FIG. 5B. In that space, the occupant detection ECU is provided and is connected to the ECU terminal.

The connector cover 4 is a rectangular parallelepiped large enough to cover the opening 31 of the connector case 3. The connector cover 4 has a closing surface 4a opposite the opening 31 of the connector case 3. The closing surface 4a is rectangular and flat. As shown in FIG. 5B, an outside rectangular peripheral shape of the closing surface 4a of the connector cover 4 is almost as large as an outside peripheral shape of the opening end face 31a of the connector case 3.

The first packing 5 and the second packing 6 are formed to be a hollow rectangle such as a "framework," as recited for example in claim 5, that is flat or has a circular cross section. It should be noted that first and second packings 5 and 6 have the same shape.

Specifically, a distance between opposite inside peripheries of the first packing 5 and the second packing 6 is slightly larger than a distance between opposite inside peripheries of the opening end face 31a of the connector case 3. The distance between opposite inside peripheries of the first packing 5 and the second packing 6 is slightly larger than a distance between opposite inside peripheries of the framework end face of the sensor terminal protection section 22.

A distance between opposite outside peripheries of the first packing 5 and the second packing 6 is slightly smaller than a distance between opposite outside peripheries of the opening end face 31a of the connector case 3 and a distance between opposite outside peripheries of the closing surface 4a of the connector cover 4. The distance between opposite outside peripheries of the first packing 5 and the second packing 6 almost equals a distance between opposite outside peripheries of the framework end face of the sensor terminal protection section 22.

The following describes arrangement of the connector case 3, the connector cover 4, the first packing 5, and the second packing 6. In the description of the arrangement, the vertical direction signifies the vertical direction in FIG. 5B.

The first packing 5 is arranged over and corresponding to the opening end face 31a of the connector case 3. A bottom end face of the first packing 5 totally contacts with the opening end face 31a of the connector case 3.

The sensor terminal protection section 22 is arranged over a top end face of the first packing 5 so that the framework end face of the sensor terminal protection section 22 corresponds to the top end face of the first packing 5. A bottom framework end face of the sensor terminal protection section 22 totally contacts with the top end face of the first packing 5.

The second packing 6 is arranged over and corresponding to a top framework end face of the sensor terminal protection section 22. A bottom end face of the second packing 6 totally contacts with the top framework end face of the sensor terminal protection section 22. That is, the second packing 6 and the first packing 5 are arranged so as to totally sandwich the sensor terminal protection section 22.

The connector cover 4 is arranged over and corresponding to a top end face of the second packing 6 so as to close the opening of the second packing 6. The closing surface 4a of the connector cover 4 totally contacts with the top end face of the second packing 6. The connector cover 4 is fastened to the connector case 3 using a bolt so as to shorten a distance to the opening end face 31a of the connector case 3.

The first packing 5 is compressed between the opening end face 31a of the connector case 3 and one end face of the sensor terminal protection section 22 along the framework axis direction. The second packing 6 is compressed between the connector cover 4 and the other end face of the sensor terminal protection section 22 along the framework axis direction.

The first packing 5 and the second packing 6 are compressed in the framework axis direction to totally sandwich each framework end face of the sensor terminal protection section 22. That is, the framework end faces of the sensor terminal protection section 22 totally contact with the corresponding packings 5 and 6 that are compressed to be deformed. The connector case 3 and the connector cover 4 also totally contact with the corresponding packings 5 and 6 that are compressed to be deformed.

The opening 31 of the connector case 3, the first packing 5, the sensor terminal protection section 22, the second packing 6, and the closing surface 4a of the connector cover 4 enclose a space, hereafter referred to as a connector space, which is thus hermetically sealed.

Figure 8A:
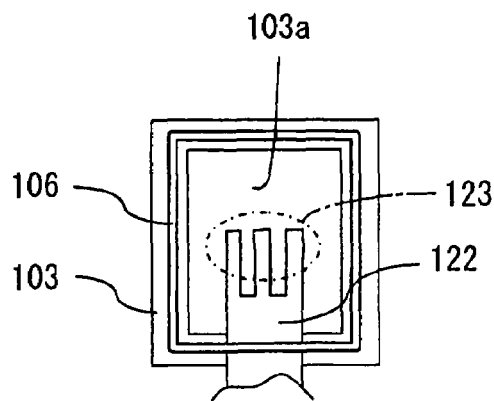
FIG. 8A is a diagram showing a plan view of a conventional connector with a connector cover removed.
Figure 8B:
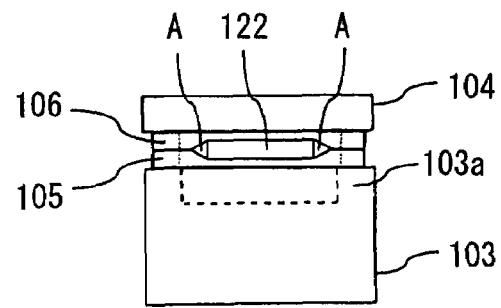
FIG. 8B is a diagram showing a front view of the connector in FIG. 8A with the connector cover mounted.

Conventionally, the connector space is equivalent to a space, hereafter referred to as a conventional connector space, enclosed by the opening 131 of the connector case 103, the first packing 105, the sensor end 122, the second packing 106, and the closing surface 104a of the connector cover 104. As shown in FIG. 8B, the conventional connector space contains a gap A along sides of the sensor end 122. A packing such as expensive silicone gel is used to fill the gap A.

The first embodiment allows no gap between the first packing 5 and the sensor terminal protection section 22 and between the second packing 6 and the same to isolate the connector space from the outside of the connector. The construction according to the first embodiment causes no gap between the outside of the connector and the connector space and improves the connector's waterproof performance.

The connector space contains the sensor terminal section 23 because it is formed inside the sensor terminal protection section 22. The ECU terminal is mounted from the bottom of the opening 3a for the connector case 3 to the connector space so as to contact with an electrode terminal 23a of the sensor terminal section 23. Possibilities of short-circuiting and a contact failure due to water exposure decrease because the sensor terminal section and the ECU terminal are contained in the connector space with the improved waterproof performance.

As mentioned above, the occupant detection system 1 according to the first embodiment can improve the waterproof performance for the connector and decrease possibilities of exposing the sensor terminal section and the ECU terminal therein to water. The system can therefore prevent the sensor terminal section and the ECU terminal from increasing a stray capacitance and anomalies such as short-circuiting and a contact failure from occurring. Since the packing material is not expensive, production costs can be decreased.

The first embodiment can improve the connector's waterproof performance without using the first packing 5 and the second packing 6. The sensor terminal protection section 22 is totally sandwiched between the connector cover 4 and the opening end face 31a of the connector case 3. It is desirable to use a relatively soft resin to form the connector case 3 and the connector cover 4 because of the effectiveness of the packings' compression, which improves not only adhesiveness among the connector case 3, the sensor terminal protection section 22, and the connector cover 4, but also the waterproof performance.

The first packing 5 and the second packing 6 may be shaped so that each integrally possesses a packing member having a semicircular cross section on the packing surfaces against the sensor terminal protection section 22, the connector case 3, and the connector cover 4. That is, the packings 5 and 6, before pressed, may become vertically double-convex when FIG. 5B as the front view of the packings 5 and 6 is shown in section. The packings 5 and 6 may include multiple convex portions. The first packing 5 and the second packing 6 may have different cross sections.

Figure 5C:
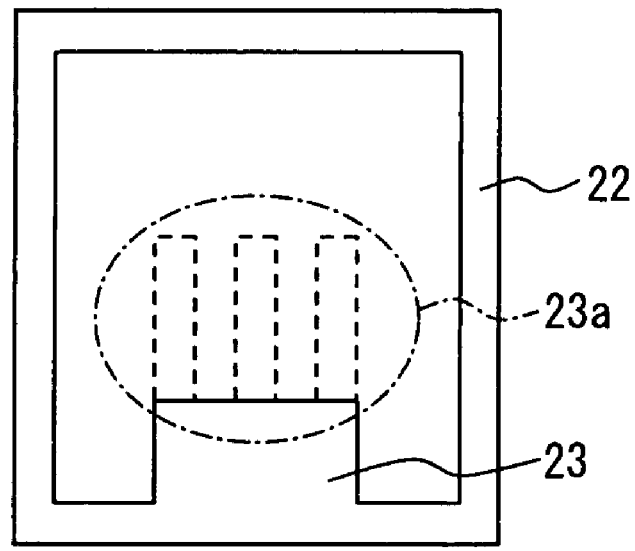
FIG. 5C is a diagram showing a partially enlarged view of the sensor terminal and protection portion of the connector in FIG. 5A.

As can be seen in FIG. 5C, the sensor terminal 23, which corresponds for example to a root of the fork like portion, is made of a non-conductive film. The conductive terminal 23a functions as an actual terminal, such as the tip of the fork like portion. Thus the root of the fork like portion or sensor terminal 23 and the sensor terminal protection portion 22 are integrated into a film. The sensor terminal protection portion 22 has a square opening.

Second Embodiment

Figure 6:
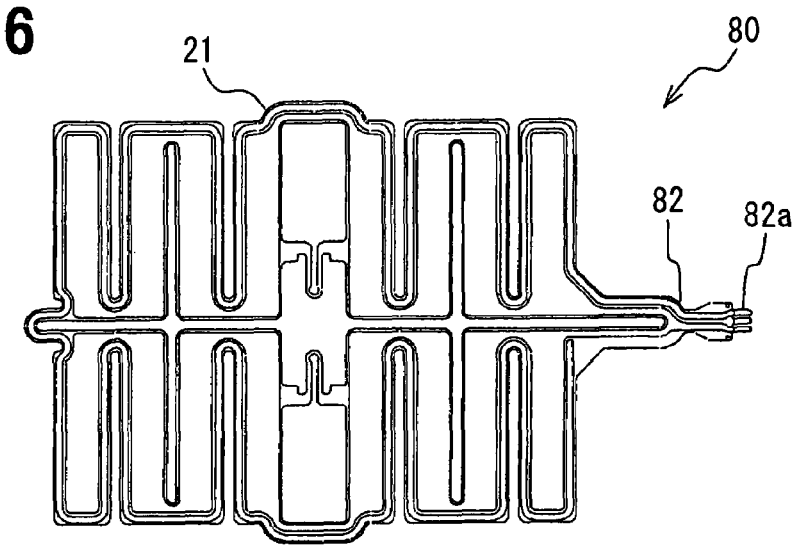
FIG. 6 is a diagram showing a plan view of an occupant detection sensor 80 according to a second embodiment.
Figure 7A:
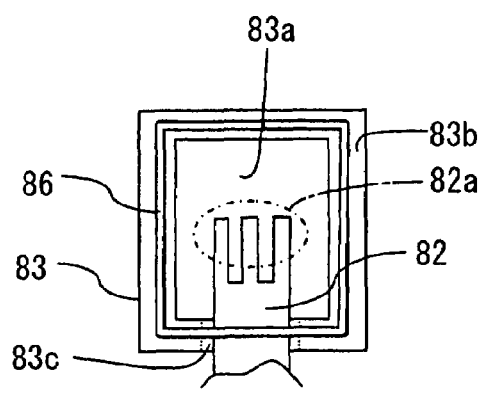
FIG. 7A is a diagram showing a plan view of a connector with a connector cover removed.
Figure 7B:
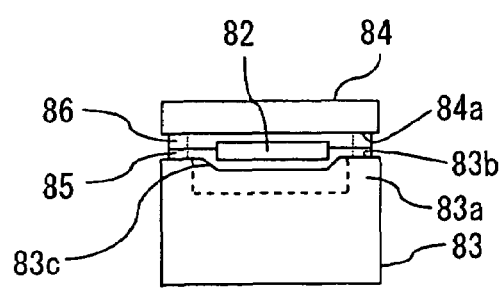
FIG. 7B is a diagram showing a front view of the connector in FIG. 7A with the connector cover mounted.

The second embodiment will be described with reference to FIGS. 6 and 7. FIG. 6 is a plan view of an occupant detection sensor 80. FIG. 7A is a plan view of a connector with a connector cover 84 removed. FIG. 7B is a front view of the connector in FIG. 7A with the connector cover 84 mounted. The same parts or components of the second and first embodiments are depicted by the same reference numerals and a detailed description thereof, where duplicative, is omitted for simplicity.

An occupant detection system according to the second embodiment includes an occupant detection sensor 80, a connector cover 84, a connector case 83, a first packing 86, and a second packing 85.

As shown in FIG. 6, the occupant detection sensor 80 includes a sensor body 21 and a sensor end 82. The sensor body 21 is a capacity type sensor and contains multiple layers of films and a conductor sandwiched between the films.

The sensor body 21 is approximately centered at the seating surface section 7. The sensor end 82 extends from the sensor body 21 to the right of FIG. 6. A width of the sensor end 82 in a vertical direction of FIG. 6 is smaller than that of the sensor body 21 in the vertical direction thereof. The sensor end 82 is tipped with a sensor terminal 82a. The conductor of the sensor body 21 is formed to continuously extend to the sensor terminal 82a of the sensor end 82. The sensor body 21 electrically connects to the sensor terminal 82a.

The connector case 83 is a rectangular parallelepiped and has an opening 83a recessed at the center of a top surface in FIG. 7B. The opening 83a has an opening end face 83b that is a hollow rectangle as shown in FIG. 7A. The hollow rectangle has the same shape as the opening end face 31a of the connector case 3 according to the first embodiment.

A groove 83c is formed from an outside periphery to an inside periphery of the connector case 83 at one of four sides of the opening end face 83b, the bottom side in FIG. 7A, corresponding to the sensor end 82 to be mounted later. The groove 83c is formed by recessing one side of the opening end face 83b to be shaped into a trapezoid with its lower base smaller than the upper base. An opening width of the groove 83c corresponding to the upper base is slightly larger than a width (a horizontal length in FIG. 7B) of the sensor end 82. A depth (a vertical length in FIG. 7B) of the groove 83c is almost the same as a thickness of the sensor 82. A width of the lower base of the groove 83c is almost the same as a width (a horizontal length in FIG. 7B) of the sensor end 82. The opening 83a of the connector case 83 contains a terminal, such as an ECU terminal, electrically connected to the occupant detection ECU (not shown).

The connector cover 84 is shaped similarly to the connector cover 4 of the first embodiment. The connector cover 84 is a rectangular parallelepiped large enough to cover the opening 83a of the connector case 83. The connector cover 84 has a closing surface 84a opposite the opening 83a of the connector case 83. The closing surface 84a is rectangular and flat. As shown in FIG. 7B of the second embodiment, an outside rectangular periphery of the closing surface 84a of the connector cover 84 is almost as large as an outside periphery of the opening end face 83a of the connector case 83.

The first packing 85 and the second packing 86 are made of resin or rubber. As shown in FIG. 7, the first packing 85 and the second packing 86 are each shaped into a flat hollow rectangle. The first packing 85 and the second packing 86 have the same shape. The first packing 85 and the second packing 86 are shaped similarly to the first packing 5 and the second packing 6 of the first embodiment.

The following describes arrangement of the connector case 83, the connector cover 84, the first packing 85, and the second packing 86. In the description of the arrangement, the vertical direction signifies the vertical direction in FIG. 7B. The first packing 85 is arranged over and corresponding to the opening end face 83a of the connector case 83. The sensor end 82 is arranged over a top end face of the first packing 85 and the groove 83c of the opening end face 83a. The second packing 86 is arranged over the top end face of the first packing 85 and the sensor end 82 so as to face the top end face of the first packing 85.

The connector cover 84 is arranged over and corresponding to a top end face of the second packing 86 so as to close an opening of the second packing 86. The closing surface 84a of the connector cover 84 is arranged so as to totally contact with the top end face of the second packing 86 over all the peripheries. The connector cover 84 is fastened to the connector case 83 using a bolt so as to shorten a distance to the opening end face 83a of the connector case 83.

The groove 83c is formed at the opening 83a of the connector case 83. The sensor end 82 is arranged over the groove 83c. The first packing 85 is pressed and deformed so as to cave along or extend into the groove 83c, such as toward the bottom of FIG. 7B. A depth of the groove 83c almost equals a thickness of the sensor end 82. The top end face of the sensor end 82 is flush with part of the top end face of the first packing 85, such as the part not caved or extended in the groove 83c. The bottom end face of the second packing 86 contacts with the flush surface over all the peripheries.

An opening width corresponding to the upper base of the groove 83c is slightly larger than the width of the sensor end 82. The first packing 85 is deformed so as to contact with sides of the sensor end 82.

The second embodiment forms the groove 83c on the connector case 83 corresponding to the sensor end 82. Accordingly, the thickness of the sensor end 82 hardly causes a step when the sensor end 82 is sandwiched between the packings 85 and 86. There is little chance of causing a gap equivalent to the gap A in FIG. 8. The groove 83c of the connector case 83 provides a space for inserting the sensor end 82 between the first packing 85 and the second packing 86. When the sensor end 82 is sandwiched therebetween by pressing, both packings can fill near the sides of the sensor end 82. According to the second embodiment, the depth of the case 83 needs to be just smaller than or equal to the thickness of the sensor end 82.

It will be appreciated that in accordance with various exemplary embodiments as disclosed and described herein, the waterproof performance for the connector improves without using an expensive material for the packings. The sensor terminal 83 and the ECU terminal can be effectively protected against short-circuiting and a contact failure due to water exposure decrease.

It will also be appreciated that, while exemplary embodiments have been disclosed herein, other embodiments not specifically described are considered as plausible and predictable variations of what is described herein, limited in scope only by the claims as appended hereto.

What is claimed is:

1. A waterproof sensor assembly comprising:
a sensor main body arranged in a vehicle seat;
a sensor terminal;
a sensor terminal protection portion;
a first packing having a hollow ring shape;
a second packing having a hollow ring shape;
a connector casing having a hollow ring shaped opening; and
a connector cover for covering the opening of the connector casing;
wherein:
the sensor terminal protection portion has a hollow ring shape and is integrated with a periphery of the sensor main body,
the sensor terminal is integrated with the sensor terminal protection portion such that the sensor terminal protrudes from an inner periphery of the sensor terminal protection portion toward an inside of the sensor terminal protection portion,
the hollow ring shape configuration of the first packing, the second packing and the connector casing, when in a closed configuration by operation of the connector cover, come into a gapless sealed relation around the sensor terminal.

2. The sensor assembly according to claim 1, wherein the connector cover is disposed between two surfaces of the connector casing such that the connector cover covers the sensor terminal protection portion.

3. The sensor assembly according to claim 1, wherein the sensor terminal protection portion is formed such that a distance between two surfaces of the sensor terminal protection portion in a direction of a framework axis that extends is uniform.

4. The sensor assembly according to claim 1 wherein the two surfaces of the sensor terminal protection portion is formed such that each of the two surfaces has a planar shape.

5. The sensor assembly according to claim 1, further comprising a circuit electrode electrically coupled with the sensor terminal, wherein the sensor terminal protection portion further includes a film stacking body having a plurality of layers, each of which has a ring shape; and a conductor sandwiched between two adjacent layers.

6. The sensor assembly according to claim 1, wherein the first packing is compressed and arranged between one surface of the connector casing and one end of the sensor terminal protection portion in the framework axis, and the second packing is compressed and arranged between the connector cover and the other end of the sensor terminal protection portion in the framework axis.

7. An occupant detecting system comprising:
an occupant detecting sensor including a sensor main body, a sensor terminal protection portion and a sensor terminal, wherein the sensor main body is arranged in at least one of a backrest section and a seating surface section in a vehicle seat, wherein the sensor terminal protection portion has a ring shape with a framework axis extending through a center thereof, and is integrated with a periphery of the sensor main body, and wherein the sensor terminal is integrated with the sensor terminal protection portion such that the sensor terminal protrudes from an inner periphery of the sensor terminal protection portion toward an inside of the sensor terminal protection portion;
a connector casing having a ring shaped opening; and a connector cover for covering the opening of the connector casing, wherein the connector cover is disposed between two surfaces of the connector casing in such a manner that the connector cover covers the sensor terminal protection portion.

8. The system according to claim 7, wherein the sensor terminal protection portion is formed such that a distance between two surfaces of the protection portion in a framework axis is uniform.

9. The system according to claim 7, wherein the two surfaces of the sensor terminal protection portion are formed such that each of the two surfaces has a planar shape.

10. The system according to claim 7, further comprising a circuit electrode electrically coupled with the sensor terminal, wherein the sensor terminal protection portion further includes a film stacking body having a plurality of layers, each of which has a ring shape; and a conductor sandwiched between two adjacent layers.

11. The system according to claim 7, further comprising:
a first packing having a ring shape; and
a second packing having a ring shape,
wherein the first packing is compressed and arranged between one surface of the connector casing and one end of the sensor terminal protection portion in the framework axis, and the second packing is compressed and arranged between the connector cover and the other end of the sensor terminal protection portion in the framework axis.

* * * * *